C. K. BRADFORD.
Velocipede.
No. 53,214.   Patented Mar. 13, 1866.
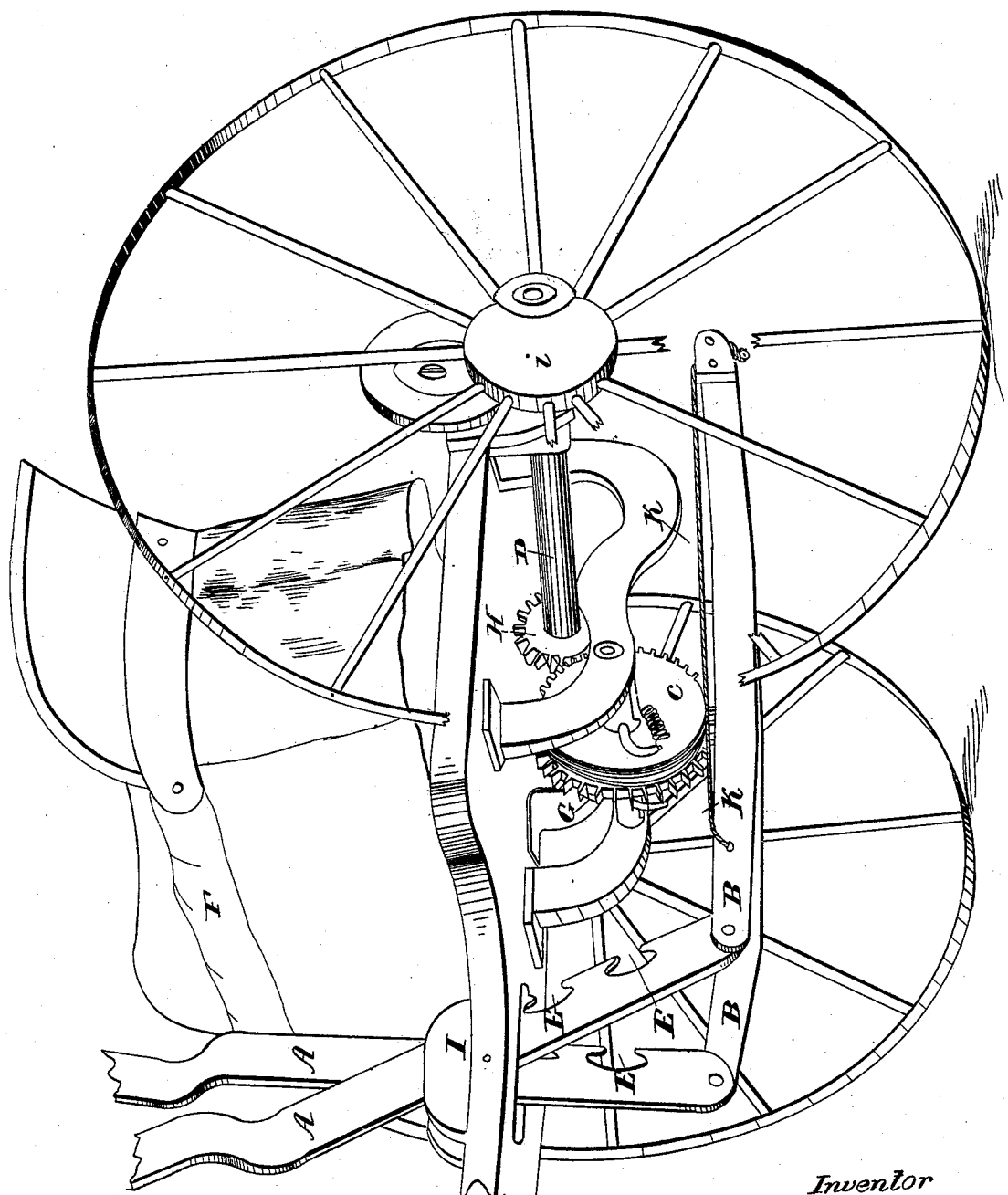
Witnesses
Inventor
Chas. K. Bradford

UNITED STATES PATENT OFFICE.

CHARLES K. BRADFORD, OF LYNN, MASSACHUSETTS, ASSIGNOR TO HIMSELF, C. B. SANNDERSON, AND MINOT TERRILL, JR., OF SAME PLACE.

IMPROVEMENT IN PROPELLING CARRIAGES.

Specification forming part of Letters Patent No. 53,214, dated March 13, 1866.

*To all whom it may concern:*

Be it known that I, CHARLES K. BRADFORD, of Lynn, in the county of Essex and State of Massachusetts, have invented a new and useful Improvement in Velocipedes; and I do hereby declare that the following is a full, clear, and exact description of the construction and operation of the same, reference being had to the accompanying drawing, forming part of this specification.

The nature of my improvement consists, first, in providing the hand-levers A A with a series of notches, E E, for the reception of the fulcrum-pin L, whereby the leverage can be readily increased or diminished at pleasure, according to the power required to propel the velocipede; second, in communicating the power of the hand-levers to the wheels by means of a friction clutch or clutches so arranged as to have a propelling action only when the levers are moved in one direction, being released when they are moved in the opposite, thereby avoiding the dead-point of the common crank-motion, and enabling the rider to exert a propelling force either by longer or shorter vibrations of the said hand-levers, as may be most convenient or agreeable, instead of being compelled to move his hands, as in other velocipedes, through a uniform space at every stroke.

To enable others skilled in the art to make and use my invention, I will now proceed to describe its construction and operation.

A A are the levers by which the rider communicates his power to the driving-wheel. B B are the connecting rods. C is the friction-clutch attached to wheel G, to which the power is communicated by cords K K, having one or more turns about the clutch C. D is the axle of the driving-wheels, having firmly fixed upon it one or more pinions, H, meshing into the cogs of the wheel G. E is the seat on which the rider sits, and K K K the friction-band surrounding the clutch C in a suitable groove, by which the power from the rods B B is communicated. E E E E are notches in the levers A A, by which the leverage can be increased or diminished by adjustment on a fulcrum-pin, L, in the body of the carriage through which the levers pass.

The wheel G is arranged with a clutch, C, forced up against it by any suitable contrivance, as a spring, and so arranged as to convey the motion of the clutch C to the wheel G when moving in one direction, but not while moving in the opposite direction, as by a ratchet, or by cutting saw-teeth cavities or recesses in the adjacent faces of the wheel and its clutch, or other suitable means.

What I claim as my invention, and desire to secure by Letters Patent, is—

1. The combination of the connecting-rods B with the friction-band K and the clutch C, transmitting motion to the wheel G, as described, in one direction only, substantially as and for the purpose described.

2. The combination of the pivot-pin L with the lever A, having notches E E, so that the leverage may be increased or diminished at will, for the purpose described.

3. The combination of the notched levers A with the combination set forth in the first claim, so as to allow greater power to be exerted without increasing the length of the stroke.

CHAS. K. BRADFORD.

Witnesses:
THOS. WM. CLARKE,
J. E. FLETCHER.